United States Patent  
Prock

(10) Patent No.: US 12,453,309 B2  
(45) Date of Patent: Oct. 28, 2025

(54) BULK SHRUB HARVESTER AND RELATED METHODS

(71) Applicant: Bridgestone Corporation, Chuo-ku (JP)

(72) Inventor: Russell Prock, Maricopa, AZ (US)

(73) Assignee: Bridgestone Corporation, Chuo-ku (JP)

( * ) Notice: Subject to any disclaimer, the term of this patent is extended or adjusted under 35 U.S.C. 154(b) by 335 days.

(21) Appl. No.: 17/922,363

(22) PCT Filed: Apr. 30, 2021

(86) PCT No.: PCT/US2021/030034  
§ 371 (c)(1),  
(2) Date: Oct. 29, 2022

(87) PCT Pub. No.: WO2021/222672  
PCT Pub. Date: Nov. 4, 2021

(65) Prior Publication Data  
US 2023/0165190 A1 Jun. 1, 2023

Related U.S. Application Data

(60) Provisional application No. 63/018,040, filed on Apr. 30, 2020.

(51) Int. Cl.  
A01D 34/835 (2006.01)  
A01D 34/23 (2006.01)  
(Continued)

(52) U.S. Cl.  
CPC ........... A01D 34/835 (2013.01); A01D 34/23 (2013.01); A01D 45/065 (2013.01); A01D 57/12 (2013.01); A01D 57/02 (2013.01)

(58) Field of Classification Search  
CPC .... A01D 34/835; A01D 34/23; A01D 45/065; A01D 45/00; A01D 57/12; A01D 57/02; A01D 78/14  
See application file for complete search history.

(56) References Cited

U.S. PATENT DOCUMENTS 2,665,920 A * 1/1954 White, Jr. .............. A01B 51/04  
172/26  
2,729,049 A * 1/1956 Porter .................. A01D 89/003  
56/177

(Continued)

FOREIGN PATENT DOCUMENTS

DE 202012104700 U1 3/2014  
RU 2153243 C1 7/2000

OTHER PUBLICATIONS

International Search Report and Written Opinion dated Sep. 22, 2021 issued by EPO in connection with corresponding International Application No. PCT/US2021/030034.

(Continued)

Primary Examiner — Joseph M Rocca  
Assistant Examiner — Julia C Tran  
(74) Attorney, Agent, or Firm — Meredith E. Hooker; Matthew P. Dugan

(57) ABSTRACT

Systems and methods of harvesting a shrub from a base of the shrub proximate a ground surface utilizing a shrub harvester include dislodging the shrub from a base of the shrub proximate the ground surface via a shrub dislodging system on the shrub harvester. The methods also include receiving the shrub via a shrub release system on the shrub harvester. The methods further include grasping the shrub via the shrub release system on the shrub harvester. The methods also include releasing the shrub via the shrub release system, which can include a plurality of catch members.

20 Claims, 6 Drawing Sheets

(51) Int. Cl.
  *A01D 45/06* (2006.01)
  *A01D 46/06* (2006.01)
  *A01D 57/02* (2006.01)
  *A01D 57/12* (2006.01)

(56) References Cited

U.S. PATENT DOCUMENTS

| | | | | |
|---|---|---|---|---|
| 3,921,375 A | * | 11/1975 | Cetrulo, Jr. | A01D 45/006 171/31 |
| 4,141,201 A | * | 2/1979 | Christensen | A01D 23/06 56/121.42 |
| 4,261,163 A | * | 4/1981 | Shaw | A01D 45/006 171/36 |
| 4,353,201 A | * | 10/1982 | Pierce | A01D 57/08 56/130 |
| 5,454,217 A | * | 10/1995 | Williamson | A01D 45/16 56/157 |
| 5,867,972 A | * | 2/1999 | Laumann | A01D 41/14 56/126 |
| 6,453,655 B2 | * | 9/2002 | Ferraris | A01D 57/03 56/220 |
| 6,662,541 B2 | * | 12/2003 | Meier | A01D 78/02 56/366 |
| 8,261,524 B1 | * | 9/2012 | McClure | A01D 89/002 56/364 |
| 10,595,463 B2 | * | 3/2020 | Walker | A01D 57/06 |
| 2008/0172998 A1 | * | 7/2008 | Fraley | A01D 43/06 56/14.6 |
| 2012/0216499 A1 | * | 8/2012 | Patterson | A01D 34/835 56/181 |
| 2016/0081265 A1 | * | 3/2016 | Scott | A01D 45/00 171/51 |
| 2020/0253120 A1 | * | 8/2020 | Hefner | A01D 34/42 |

OTHER PUBLICATIONS

First Examination Report issued on Nov. 23, 2023 by the IP Australia in connection with corresponding Australian Patent Application No. AU 2021265844.

* cited by examiner

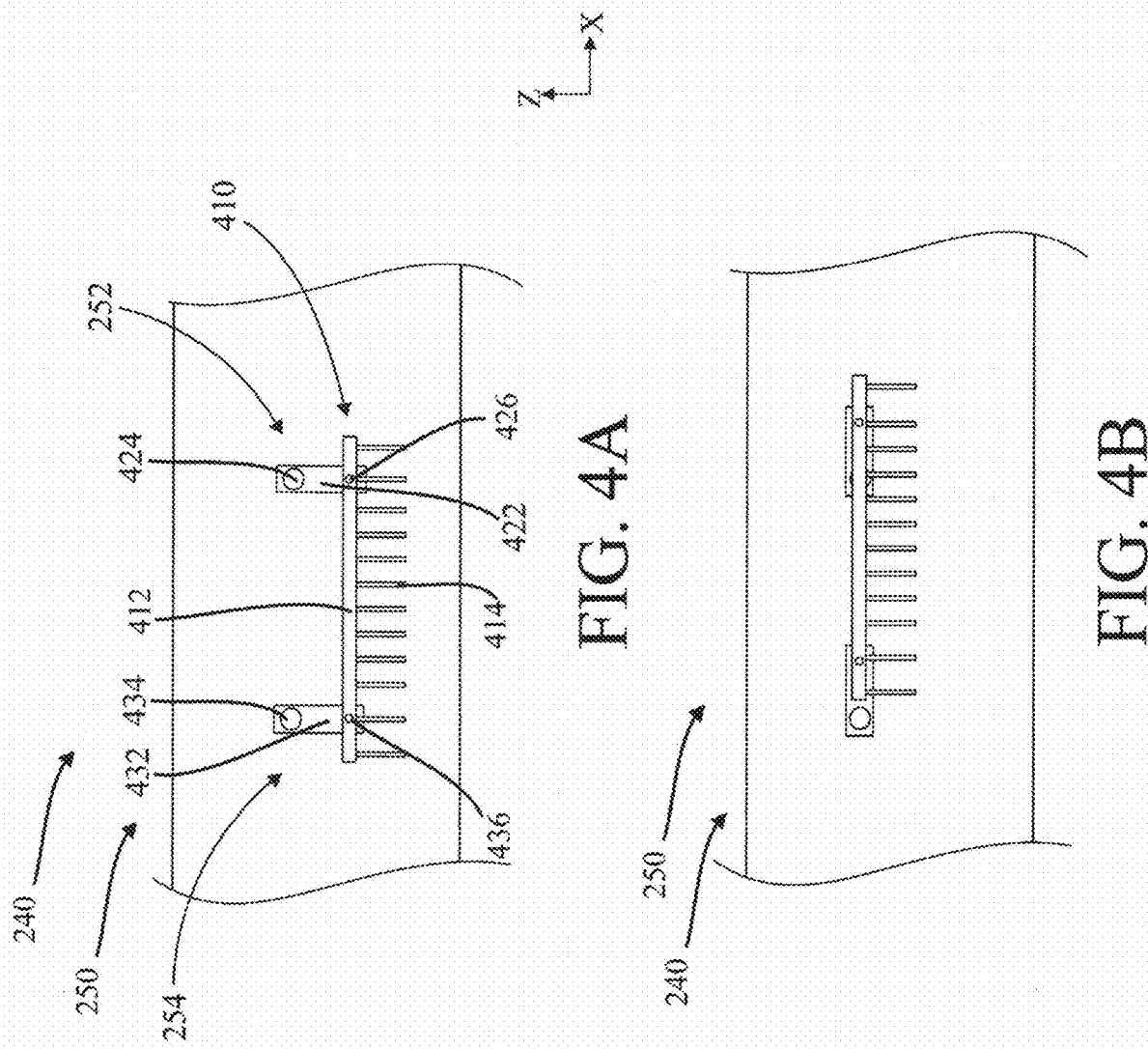

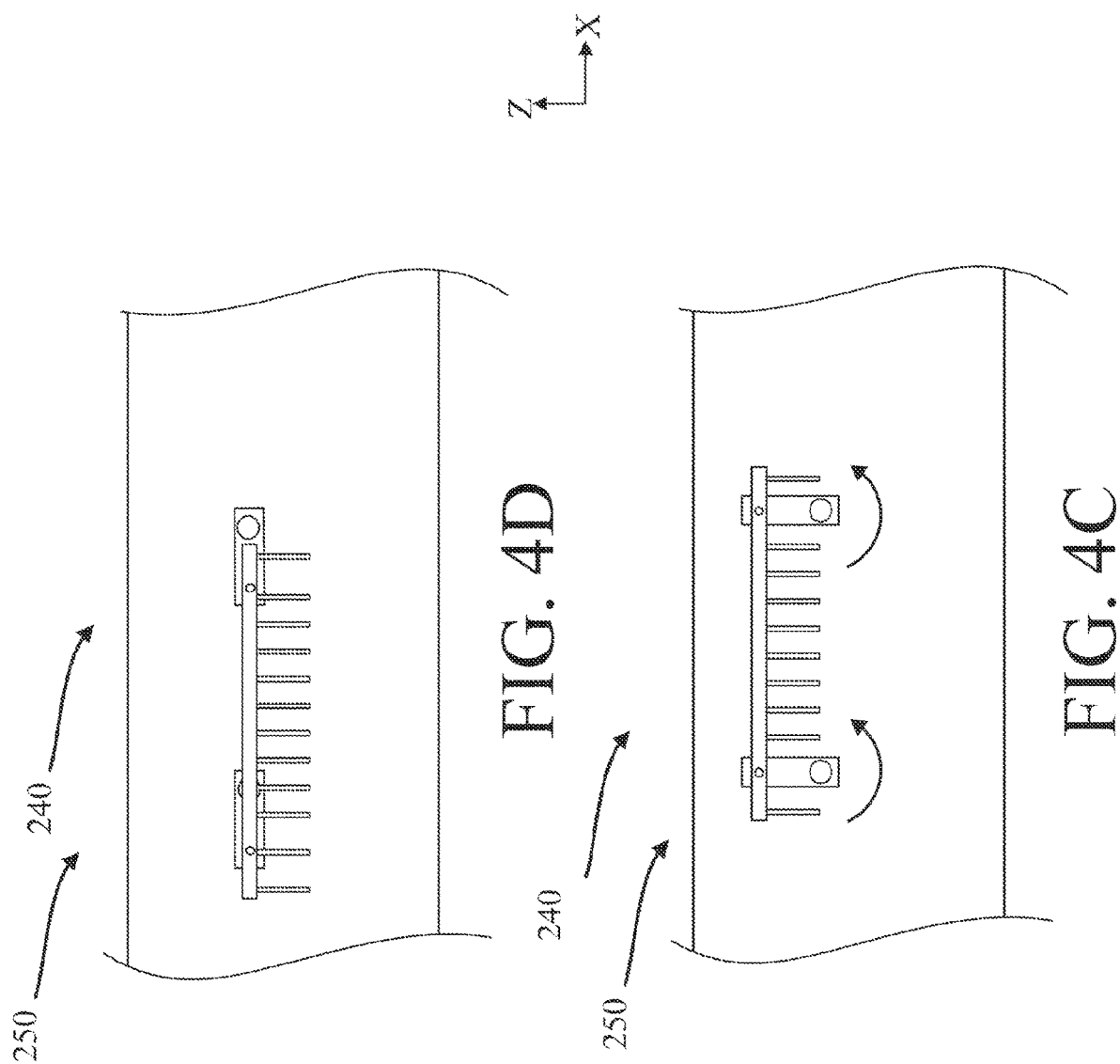

BULK SHRUB HARVESTER AND RELATED METHODS

This application is the National Stage of International Application No. PCT/US2021/030034, filed on Apr. 30, 2021, which claims the benefit of priority from U.S. Provisional Patent Application No. 63/018,040, filed on Apr. 30, 2020, the entire contents of which is hereby incorporated herein by reference.

FIELD OF THE DISCLOSURE

The present disclosure relates, generally, to bulk shrub harvester machines and, in particular, to bulk shrub harvesting machines for removing shrubs from a base of the shrub proximate a ground surface.

BACKGROUND OF THE DISCLOSURE

Harvesting shrubs is desirable for use in research and future plantings. In certain instances, it is advantageous that the shrubs are removed after their use for seed harvesting has been completed. To facilitate faster removal of shrubs, shrub harvesting machines and methods may be desirable. Manual harvesting is time consuming, expensive and limited to suitable working conditions and labor availability.

One plant that may benefit from improved harvesting techniques is the guayule plant. The guayule plant (*Parthenium argentatum*) is a shrub-like plant that contains rubber. Guayule plants are generally planted in soil, frequently in rows, and may be grown for a period prior to harvesting. The guayule plants may contain a number of seeds dispersed throughout the plant which may be harvested and planted to grow additional guayule plants, thereby increasing the amount of rubber that can be produced. Conventionally, guayule shrubs have been manually harvested, however, as stated above, manual harvesting can be time-consuming and labor intensive. Accordingly, it would be beneficial of such a system existed which would allow guayule shrubs, to be harvested efficiently.

SUMMARY OF THE DISCLOSURE

One example of a method of harvesting a shrub utilizing a shrub harvester in accordance with the subject matter of the present disclosure can include dislodging the shrub from a base of the shrub proximate a ground surface via a shrub dislodging system on the shrub harvester. The method can also include receiving the shrub via a shrub release system on the shrub harvester with the shrub release system including a plurality of catch members. The method can further include grasping the shrub via the shrub release system on the shrub harvester. The method can also include releasing the shrub via the shrub release system. In some cases, the method can further include lifting the shrub via the shrub release system over a base of the shrub dislodging system.

In various embodiments, the shrub release system can also include a reel assembly coupled to the plurality of catch members. The reel assembly can include a forward reel and an aft reel with the forward reel disposed forward of the aft reel. The reel assembly can further include a catch assembly extending from the aft reel to the forward reel. The catch assembly can include the plurality of catch members.

A reel assembly for a shrub harvester is disclosed herein. The reel assembly can include: a first sidewall; a second sidewall disposed opposite the first sidewall; a forward reel disposed between the first sidewall and the second sidewall; an aft reel disposed aft of the forward reel and disposed between the first sidewall and the second sidewall; a plurality of catch assemblies extending from the aft reel to the forward reel with each catch member in the plurality of catch assemblies including a plurality of catch members extending below an elongated support; and a pass-through opening defined by the first sidewall and the second sidewall such that the pass-through opening is configured to receive a shrub.

In various embodiments, the plurality of catch assemblies can be configured to grasp the shrub and pull the shrub over a base during operation of the shrub harvester. Each catch assembly in the plurality of catch assemblies can extend from an aft support shaft of the aft reel to a forward support shaft of the forward reel. The reel assembly can further include an aft main shaft assembly of the aft reel and a forward main shaft assembly of the forward reel. The aft support shaft can be disposed radially outward from the aft main shaft assembly, and the forward support shaft can be disposed radially outward from the forward main shaft assembly. The aft reel rotates about an aft longitudinal axis defined by the aft main shaft assembly, and the forward reel rotates about a forward longitudinal axis defined by the forward main shaft assembly. In some cases, the aft reel and the forward reel can be configured to rotate simultaneously. A first plane defined by the aft support shaft for a respective catch assembly in the plurality of catch assemblies and the aft longitudinal axis can be at least approximately aligned (e.g., substantially parallel) to a second plane defined by the forward support shaft for the respective catch assembly in the plurality of catch assemblies and the forward longitudinal axis.

A shrub harvester is disclosed herein. The shrub harvester can include a shrub dislodging system and a shrub release system situated aft of the shrub dislodging system. The shrub dislodging system can be configured to dislodge a shrub from a base of the shrub proximate a ground surface. In some cases, the shrub dislodging system can include a first plurality of blades coupled to a base. The shrub release system can be configured to grasp a shrub dislodged from its base via the shrub dislodging system. In some cases, the shrub release system can include a reel assembly configured to lift the shrub over the base.

In various embodiments, the shrub harvester can further include a first sidewall and a second sidewall. The reel assembly can be coupled to the first sidewall and the second sidewall. The shrub dislodging system can also include a first vertical cutter disposed at a first front end of the first sidewall and a second vertical cutter disposed at a second front end of the second sidewall. The reel assembly can further include an aft reel, a forward reel, and a plurality of catch assemblies extending from the aft reel to the forward reel. One or more catch assemblies in the plurality of catch assemblies can include an elongated support and a plurality of catch members extending from the elongated support. In some cases, one or more catch assemblies in the plurality of catch assemblies can be offset vertically from an adjacent catch assembly in the plurality of catch assemblies. The shrub release system can be configured to release the shrub aft of the shrub harvester during operation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The above and other features, examples and advantages of aspects or examples of the present disclosure are better understood when the following detailed description is read with reference to the accompanying drawings, in which:

FIGS. 4A, 4B, 4C, and 4D are diagrams illustrating an exemplary reel assembly of a shrub harvester in accordance with various embodiments of the present disclosure from a cross-sectional view during use of the shrub harvester; and, FIG. 5 is a diagram illustrating a portion of an exemplary shrub dislodging system of a shrub harvester from a front perspective view in accordance with various embodiments of the present disclosure.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

The present disclosure refers to and describes systems and methods of harvesting shrubs utilizing a bulk shrub harvester. It should be appreciated that the broader process steps described herein may be accomplished by a variety of equipment configurations and sub-process steps, each of which are within the scope of the present invention. For example, the following disclosure describes harvesting guayule shrubs. Particular equipment is generally described as being suitable for such guayule shrub harvesting. However, other equipment may be implemented to accomplish the function of harvesting guayule shrubs described herein. Additionally or alternatively, the present systems and methods may be implemented or adapted to harvest other types of shrubs and/or be used in connection with shrubs other than guayule.

In accordance with various embodiments of the present disclosure, a shrub harvester may be utilized to decrease the amount of time it takes to harvest shrubs, such as guayule. Such a shrub harvester can generally include a plurality of blades operably mounted to a base and configured to receive a plurality of shrubs. The plurality of blades may extend forward of the base and can be configured to engage, and cut through, a base of a shrub proximate a ground surface. The shrubs, once dislodged, may generally be grasped by a shrub release system, pulled over the base via the shrub release system, and released aft of the shrub harvester to be collected at a later time. As such, various embodiments of the present disclosure may be more efficient and less labor intensive in harvesting guayule shrubs than traditional manual harvesting techniques.

As used herein, "aft" refers to the direction associated with the back end of a shrub harvester. As used herein, "forward" refers to the direction associated with the front end of a shrub harvester, or generally, to the direction of motion.

Figure 1:
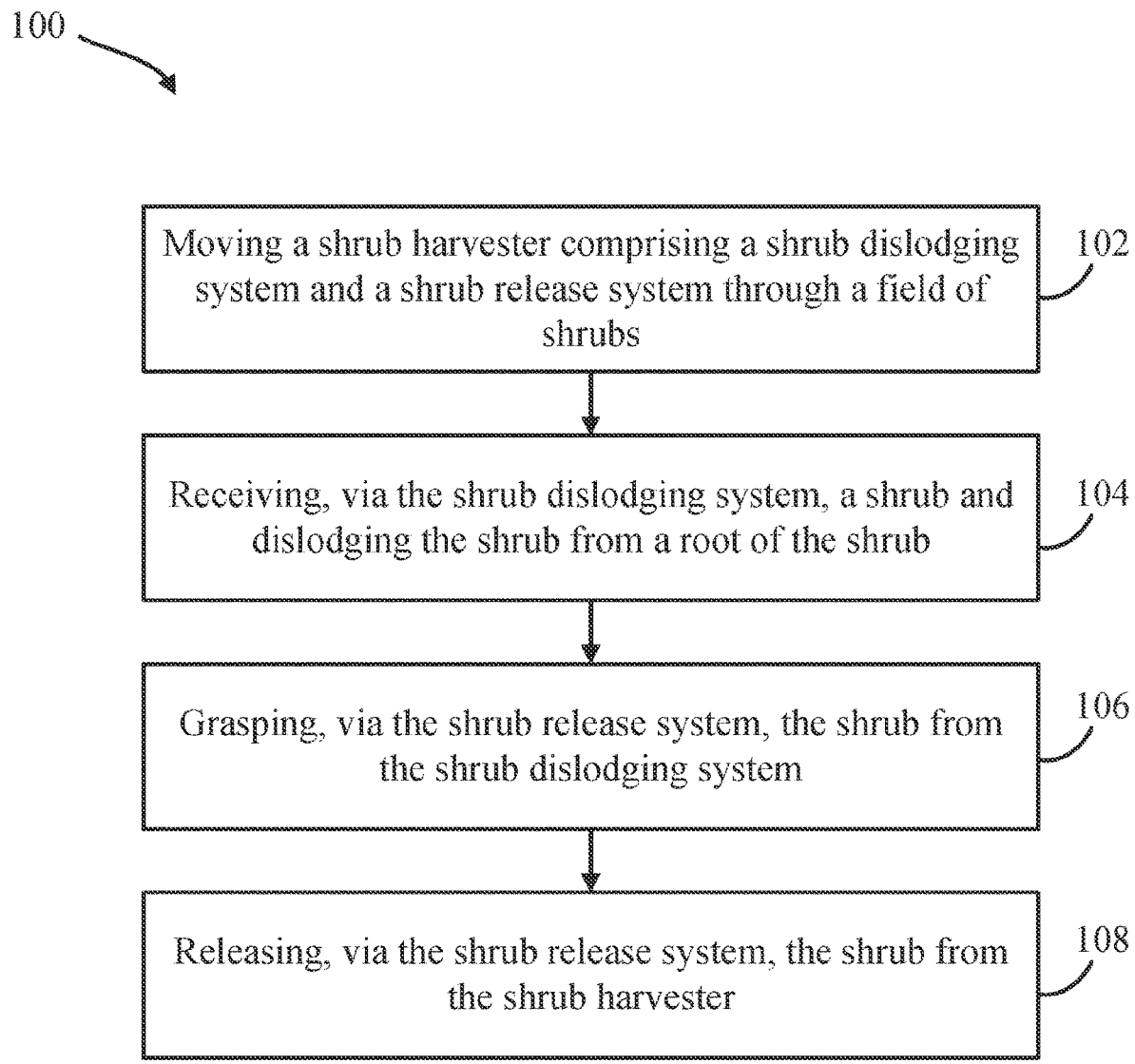
FIG. 1 is a diagram illustrating one example of a method of harvesting a shrub utilizing a bulk shrub harvester in accordance with various embodiments of the present disclosure.

Accordingly, in accordance with various embodiments and with reference to FIG. 1, a method 100 for harvesting a shrub utilizing a shrub harvester is illustrated. The method steps are illustrated in block-diagram format to re-emphasize that the shrub harvester is not limited to any specific structure, however, an exemplary embodiment will be discussed further below with reference to FIGS. 2-5. Generally, method 100 can include moving a shrub harvester that includes a shrub dislodging system and a shrub release system through a field of shrubs, such as is represented in FIG. 1 by reference number 102. The method can also include receiving, via the shrub dislodging system, a shrub and dislodging the shrub from a root of the shrub, such as is represented in FIG. 1 by reference number 104. In various embodiments, receiving the shrub can further include dislodging the shrub from an adjacent shrub via the shrub dislodging system. Method 100 can also include grasping, via the shrub release system, the shrub from the shrub dislodging system, such as is represented in FIG. 1 by reference number 106. In various embodiments, grasping the shrub can further include lifting the shrub over a base of the shrub dislodging system via the shrub release system. The method can further include releasing, via the shrub release system, the shrub from the shrub harvester, such as is represented in FIG. 1 by reference number 108. In this regard, a plurality of shrubs may be aligned in a row and harvested together, and/or left in the field to be baled at a later time. In various embodiments, method 100 may allow for more efficient shrub harvesting than typical shrub harvesting methods.

Figure 2:
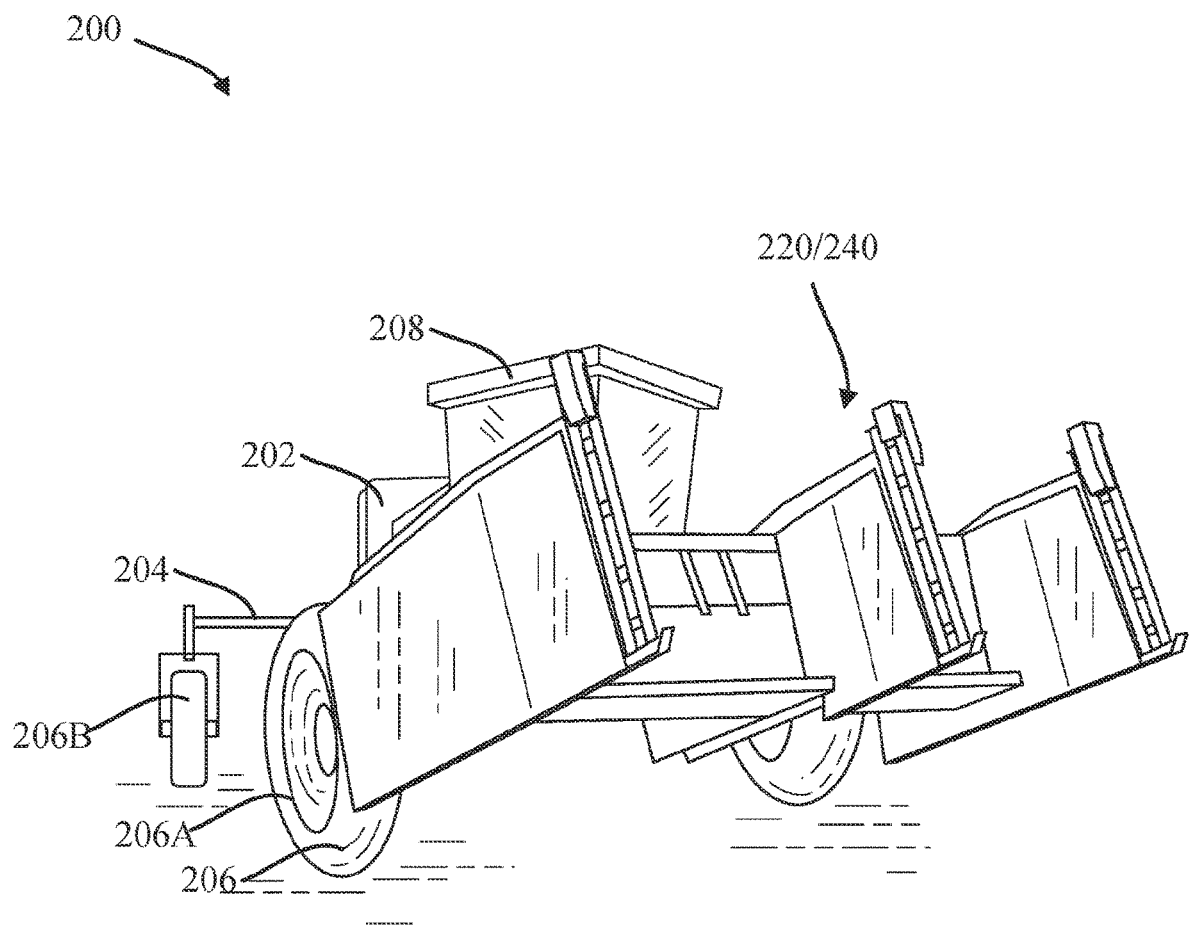
FIG. 2 is a diagram illustrating an exemplary shrub harvester in accordance with various embodiments of the present disclosure from a front perspective view.

Referring to FIG. 2, an exemplary shrub harvester 200 is illustrated from a front perspective view, in accordance with various embodiments. Shrub harvester 200 may generally include a vehicle configured to be driven through a field of shrubs, such as guayule shrubs, and be used to harvest shrubs and/or remove shrubs from roots disposed in the ground. "Shrubs," as disclosed herein may include roots disposed in the ground, which may include several stems extending above the ground and acting as a base of the shrub. Shrub harvester 200 may generally be configured to separate the stems proximate the base of the shrub, resulting in separating the shrub from roots of the shrub disposed in the ground.

In various embodiments, shrub harvester 200 can include a shrub harvester body 202 that can include a chassis 204 including a plurality of wheels 206. Chassis 204 may include a powertrain that can include an engine configured to generate power and a drivetrain configured deliver power to one or more of wheels 206 to propel shrub harvester 200. In some cases, shrub harvester 200 may be configured to travel at a speed of approximately 0 to 15 mph, or more specifically, approximately 13.4 mph, to and from a field and at a speed approximately 0 to 5 mph, or more specifically, approximately 3.2 mph through a field while harvesting.

In various embodiments, plurality of wheels 206 may include two front wheels 206a and two rear wheels 206b. In various embodiments, two front wheels 206a can have dimensions larger than two rear wheels 206b. As a non-limiting example, two front wheels 206a could have a diameter of approximately 46" and a width of approximately 13.6", while two rear wheels 206b may comprise a diameter of approximately 24" and a width of approximately 9". Such a configuration may allow shrub harvester 200 to harvest shrubs comprising a width of 160" and a height of 30", while allowing shrub harvester 200 to move between rows of shrubs. For example, in various embodiments, shrubs may be planted in a field approximately 38 inches to approximately 40 inches apart. As such, the wheels in two front wheels 206a and the wheels in two rear wheels 206b may be spaced apart such that the wheels may fit between the beds. Further, the larger dimensions of two front wheels 206a may provide adequate support for the front end of the shrub harvester, which may generally comprise a weight greater than a rear portion of the shrub harvester. While discussed herein as including two front wheels 206a and two rear wheels 206b, shrub harvester 200 is not limited in this regard and may include any other transportation system capable of moving shrub harvester 200 to, from, and throughout a field to harvest shrubs.

In various embodiments, an operator may sit within a cabin 208, which may function similar to a cabin in other vehicles, in order to provide shelter for an operator operating shrub harvester 200. Cabin 208 can include a seat, steering wheel, and other controls configured to communicate instructions to various systems of shrub harvester 200 during operation. For example, cabin 208 can include one or more controls configured to operate a throttle to control a speed of shrub harvester 200, one or more controls configured to operate a shrub dislodging system and a release system. As would be appreciated, cabin 208 may further comprise controls for various other systems of shrub harvester 200, for example, external and internal lighting systems, air conditioning, etc. All of such controls as well as any systems and/or devices thereof are collectively represented in FIG. 3 by dashed box CTL. In various embodiments, shrub harvester 200 can include a ladder coupled to one side of cabin 208 and configured to allow an operator to enter and exit cabin 208.

As previously discussed with reference to FIG. 1 and method 100, in accordance with various embodiments, shrub harvester 200 may generally include one or more shrub dislodging systems, such as are represented by reference number 220, and one or more shrub release systems, such as are represented by reference number 240. Shrub dislodging system 220 can include any suitable system configured to dislodge shrubs from, and/or remove shrubs from, a base and/or root disposed in the ground. Furthermore, shrub dislodging system 220 can include any suitable system configured to dislodge a first shrub from an intertwined adjacent shrub. Shrub release system 240 can include any system configured to grasp shrubs from shrub dislodging system 220, lift the shrubs over a base of the shrub dislodging system, and release the shrub aft of the shrub harvester 200. Accordingly, while discussed herein with reference to specific embodiments comprising specific structural elements, shrub harvester 200 is not limited in this regard and can include any system capable of dislodging, grasping, lifting, and releasing a shrub during a harvesting process.

Figure 3:
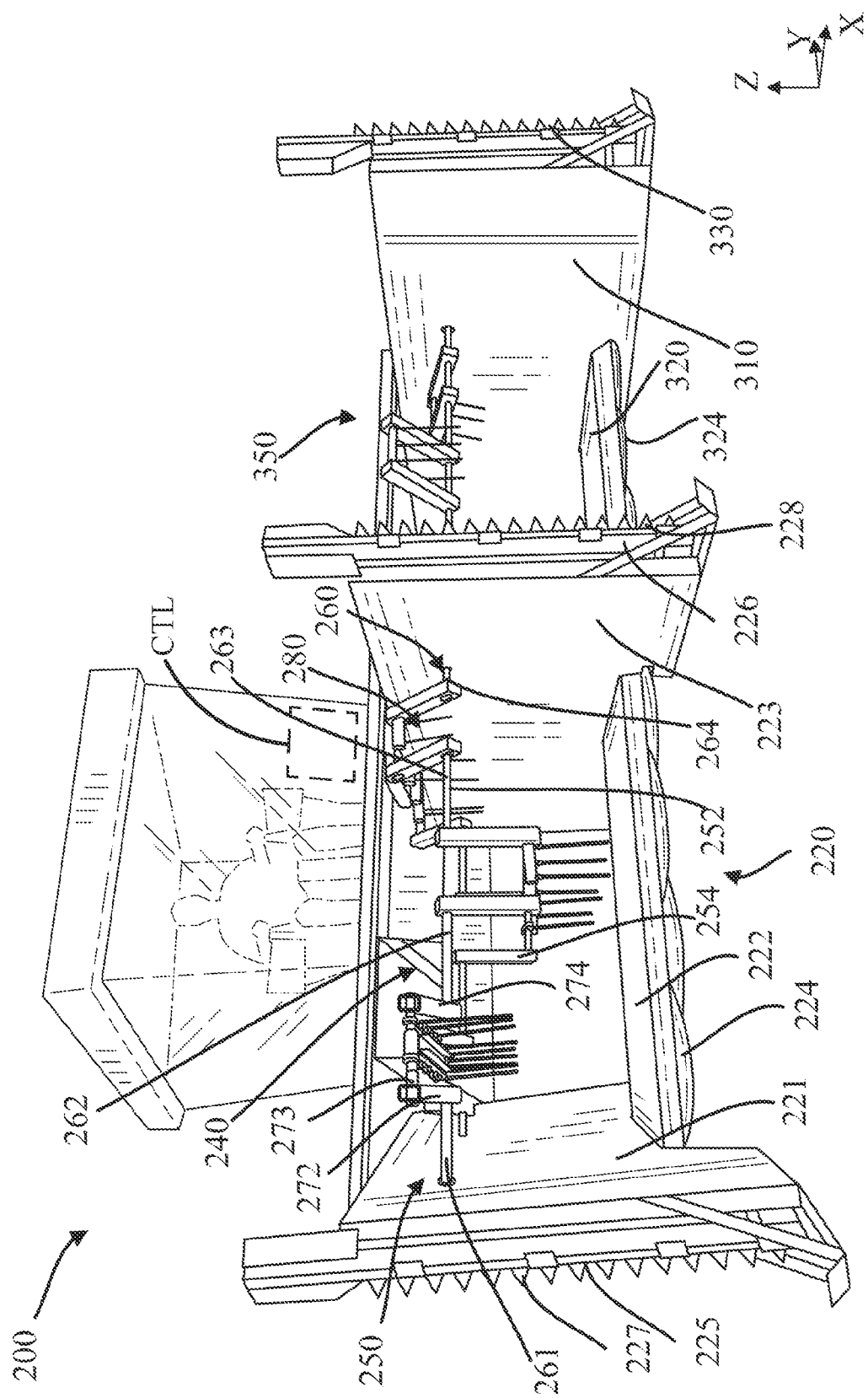
FIG. 3 is another diagram illustrating an exemplary shrub harvester in accordance with various embodiments of the present disclosure from a front perspective view.

In accordance with various embodiments and with reference to FIG. 3, shrub harvester 200 is illustrated from a perspective view. Shrub dislodging system 220 may generally include a first base 222 mounted to a first sidewall 221 and a second sidewall 223 of shrub harvester 200. Shrub dislodging system 220 may further generally include a plurality of blades 224 rotatably coupled to the first base 222. Blades 224 may be generally configured to dislodge a shrub from a base of the shrub proximate a ground surface.

The plurality of blades can generally extend below and forward of first base 222. In this regard, shrub harvester 200 moves through a field of shrubs, plurality of blades 224 can contact stems proximate a base of a shrub and dislodge the shrub from a root of the shrub disposed in the ground. In various embodiments, plurality of blades 224 are configured to rotate in a plane at least approximately aligned with (e.g., substantially parallel to) a ground surface (e.g., the X-Y plane). In various embodiments, by extending plurality of blades 224 below first base 222, shrub dislodging system 220 may be configured to cut the base of the shrub closer to the ground. Although described herein as including a plurality of annular blades, any cutting mechanism configured to dislodge a base of a shrub proximate a ground surface is within the scope of this disclosure. For example, first base 222 can include a horizontal cutter, a scissor mechanism, or any cutting mechanism disposed configured to dislodge a shrub from a base proximate a ground surface.

In various embodiments, first base 222 can include a gearbox disposed therein. The gearbox may be coupled to a hydraulic system configured to drive the gearbox and spin one or more of plurality of blades 224. In various embodiments, blades 224 can be configured to rotate at a speed within a range of from approximately 1,000 revolutions per minute (RPMs) to approximately 3,000 RPMs, or more preferably at a speed within a range of from approximately 1,500 RPMs to approximately 2,500 RPMs, or even more preferably at a speed of approximately 2,000 RPMs.

In various embodiments, first sidewall 221 may be separated from second sidewall 223 by a distance within a range of approximately 0 to approximately 320 inches, more preferably by a distance within a range of approximately 80 inches to approximately 240 inches, or even more preferably by a distance of approximately 160 inches to allow shrub harvester 200 to move through a field and dislodge at least two shrubs at a time between first sidewall 221 and second sidewall 223. However, first sidewall 221 and second sidewall 223 are not limited in this regard and may be separated more or less depending on a particular application, size of the plants, and/or spacing of rows.

In various embodiments, shrub dislodging system 220 can further include a first vertical cutter 225 and a second vertical cutter 226. First vertical cutter 225 and second vertical cutter 226 are generally configured to separate a first shrub from an adjacent shrub a row over (i.e., a second, different shrub in an adjacent row of shrubs). As such, although described herein as including vertical cutters 225, 226 any apparatus configured to separate a first shrub from a second shrub disposed within an adjacent row of shrubs may be utilized. For example, shrub dislodging system 220 can include a sharp static blade, vertical rotary blades, a scissor cutting mechanism, or any other cutting mechanism to separate intertwined shrubs.

First vertical cutter 225 is generally disposed at a front end of first sidewall 221 and second vertical cutter 226 is disposed at a front end of second sidewall 223. In various embodiments, first vertical cutter 225 and second vertical cutter 226 are generally configured to translate vertically (e.g., the Z-axis) during operation of shrub harvester 200. In this regard, first vertical cutter 225 and second vertical cutter 226 may be configured to cut a side of a respective shrub and/or dislodge the side of the respective shrub from an adjacent shrub. For example, a first shrub may become intertwined with an adjacent shrub as guayule shrubs often attach to anything and everything. In various embodiments, by translating first vertical cutter 225 and second vertical cutter 226, first vertical cutter 225 and second vertical cutter 226 may act as a knife system and cut any intertwined branches of adjacent shrubs.

In various embodiments, first vertical cutter 225 can include a plurality of blades 227 and second vertical cutter 226 can include a plurality of blades 228. It will be appreciated that blades 227 and/or 228 can be of any suitable size, shape, type, kind and/or configuration, such as sickle blades or any other blades known in the art.

In various embodiments, shrub release system 240 generally includes a reel assembly 250 that can be generally configured to grasp one or more shrubs, lift the one or more shrubs over first base 222, and/or release the one more shrub aft of shrub harvester 200, such as is outlined in steps 106 and/or 108 of method 100, for example.

Reel assembly 250 can generally include a forward reel 252 and an aft reel 254. Forward reel 252 and aft reel 254 can extend from first sidewall 221 to second sidewall 223. In some cases, reel assembly 250 can be coupled to a hydraulic system and operated independently of plurality of blades 224. Forward reel 252 and/or aft reel 254 can include a shaft assembly 260 coupled to first sidewall 221 and second sidewall 223. Forward reel 252 and/or aft reel 254 can be configured to rotate about a respective longitudinal axis defined by shaft assembly 260 (e.g., Y-axis) of the respective reel (e.g., forward reel 252 or aft reel 254). Reel assembly 250 can further include a plurality of catch assemblies 280. One or more catch assembly in plurality of catch assemblies 280 can extend from a support of forward reel 252 aft (e.g., along the X-axis) to a support of aft reel 254. In this regard, the plurality of catch assemblies may be configured to grasp a respective shrub at a forward position proximate shrub dislodging system 220, pull the respective shrub through shrub release system 240 via catch assembly 280 and release the respective shrub aft of shrub harvester 200. Although described herein as including a forward reel 252 and an aft reel 254, any reel assembly configured to grasp, lift, and release a shrub is within the scope of this disclosure. For example, a reel assembly configured to travel around a track, grasp a shrub at a low point proximate shrub dislodging system 220, lifting the shrub over first base 222, and releasing the shrub aft of the shrub harvester would be within the scope of this disclosure.

In various embodiments, one or more reels in reel assembly 250 can include a first side support, a second side support, a top support for each respective catch assembly in plurality of catch assemblies 280. For example, forward reel 252 can include a first side support 272, a second side support 274, and a top support 273. First side support 272 extends outward from a first end shaft 261 of shaft assembly 260. Similarly, second side support 274 extends outward from first end shaft 261 of the shaft assembly 260 in a parallel direction opposite first side support 272. Top support 273 extends from an outer end of first side support 272 to an outer end of second side support 274. Each catch assembly in the plurality of catch assemblies may be coupled to a top support of forward reel 252 and a top support of aft reel 254. In this regard, one or more catch assembly in plurality of catch assemblies 280 may extend in a direction of motion of the shrub harvester (e.g., along the X-axis). Each catch assembly in plurality of catch assemblies 280 may generally be configured to grasp a shrub, for example, a guayule shrub. Although described throughout the disclosure as comprising catch members, any system/assembly configured to grasp shrubs is within the scope of this disclosure. For example, shrub release system 240 can include translating clamping members, translating clamping sheets, a rotating track on the base coated with an adhesive to temporarily adhere to the shrub, or any other components configured to generally grasp a shrub, pull the shrub over the base, and/or release the shrub aft of the shrub harvest, such as is outlined in steps 106 and/or 108 of method 100.

In various embodiments, one or more catch assembly of plurality of catch assemblies 280 may be offset from an adjacent catch assembly of the plurality of catch assemblies. For example, each respective support for a catch assembly may define a plane, such as a plane defined by first side support 272, top support 273, and second side support 274. In various embodiments, each plane may be offset equidistant based on the number of catch assemblies in the plurality of catch assemblies. For example, for three catch assemblies, a first plane defined by the first set of supports (e.g., supports 272, 273, 274) of forward reel 252 may be offset 120 degrees from a second set of supports of forward reel 252 coupled to a second catch assembly, which may be offset 120 degrees from a third set of supports of forward reel 252 coupled to the third catch assembly. In this regard, each catch assembly in plurality of catch assemblies 280 could be disposed at different heights during operation, which may ensure that one of the catch assemblies in the plurality of catch assemblies is always engaging a shrub during operation.

In various embodiments, shaft assembly 260 may further comprise a first middle shaft 262, a second middle shaft 263, and a second end shaft 264. First middle shaft 262 may be disposed between a side support for a first catch assembly and a side support for a second catch assembly in plurality of catch assemblies 280. Similarly, second middle shaft 263 may be disposed between a side support for the second catch assembly and a side support for a third catch assembly in plurality of catch assemblies 280. Second end shaft 264 may extend from a side support for the third catch assembly to second side wall 223. In various embodiments, first end shaft 261, first middle shaft 262, second middle shaft 263, and second end shaft 264 may be co-planar and define a longitudinal axis of shaft assembly 260 about which a reel of reel assembly 250 (e.g., forward reel 252 or aft reel 254) may rotate. Although illustrated as having two end shafts and two middle shafts, shaft assembly 260 is not limited in this manner and can include more or less shafts in an alternative manner depending on the application.

In various embodiments, shrub harvester 200 may further include a third sidewall 310. Second sidewall 223 may be disposed between first sidewall 221 and third sidewall 310. The shrub harvester can further include a second base 320 mounted to second sidewall 223 and third sidewall 310. Second base 320 may be in accordance with or otherwise similar to first base 222. For example, second base 320 can include a plurality of blades 324 rotatably coupled to second base 320. Plurality of blades 324 may extend below and forward of second base 320. Plurality of blades 324 may be in accordance with or otherwise similar to plurality of blades 224. In this regard, shrub harvester 200 moves through a field of shrubs, plurality of blades 324 may contact stems at a base of a shrub and dislodge the shrub from a root of the shrub of an adjacent row of shrubs to plurality of blades 224. In various embodiments, first base 222 and second base 320 may be integrally formed as a continuous base extending from first sidewall 221 through second sidewall 223 to third sidewall 310. In this regard, a continuous base may contain a gearbox disposed therein configured to rotate two or more blades of the plurality of blades coupled to the continuous base (e.g., combined base 222, 310).

In various embodiments, shrub dislodging system 220 can further include a third vertical cutter 330 that can be disposed disposed at a front end of third sidewall 310. In various embodiments, third vertical cutter 330 may be in accordance with or otherwise similar to first vertical cutter 225 and/or second vertical cutter 226. In this regard, third vertical cutter 330 is configured to translate vertically (e.g., the Z-axis) during operation of shrub harvester 200, such as has been described with respect to first vertical cutter 225 and second vertical cutter 226 as disclosed herein.

In various embodiments, shrub harvester 200 can further include a second reel assembly 350 disposed between second sidewall 223 and third sidewall 310. Second reel assembly 350 may be in accordance with or otherwise similar to reel assembly 250. In this regard, in accordance with various embodiments, the shrub harvester may be configured to dislodge and release multiple rows of shrubs simultaneously.

In various embodiments, first sidewall 221 and second sidewall 223 may generally form a substantially square-shaped pass-through opening or window with each side of the square-shaped opening or window comprising a length within a range of from approximately 4 feet to approximately 10 feet, or more preferably a length of approximately 7 feet. Similarly, second sidewall 223 and third sidewall 310 may generally form a substantially square-shaped window in accordance with or otherwise similar to the square-shaped window defined by first sidewall 221 and second sidewall 223. In various embodiments, the substantially square-shaped pass-through opening or window may be sized and configured to receive between 1 and 3 shrubs simultaneously, or more preferably approximately two shrubs simultaneously. In this regard, shrub harvester 200 may be configured to efficiently harvest several rows of shrubs, for example, a plurality of rows of guayule shrubs, in a manner resulting in a simple removal of the shrubs from stems proximate a base of the shrub and release the shrubs into the field aft of shrub harvester 200.

Referring now to FIGS. 4A-4D, a cross-sectional view of a portion of a reel assembly 250 for use in shrub release system 240 is illustrated, in accordance with various embodiments. The reel assembly includes forward reel 252, aft reel 254 and a catch assembly 410 of plurality of catch assemblies 280 from FIG. 3. Forward reel 252 includes a side support 422, a main shaft 424, and a top support shaft 426. Similarly, aft reel 254 comprises a side support 432, a main shaft 434, and a top support shaft 436. In various embodiments, main shafts 424, 434 may be in accordance with or otherwise similar to first end shaft 261, first middle shaft 262, second middle shaft 263, and/or second end shaft 264 from FIG. 3 for a respective reel (e.g., forward reel 252, aft reel 254).

Catch assembly 410 includes an elongated support 412, and a plurality of catch members 414, which can extend in a downward direction (e.g., a Z-direction) from elongated support 412. Plurality of catch members 414 may be configured to hang from elongated support 412 due to gravity. In various embodiments, plurality of catch members 414 may be spaced axially along a direction of motion of shrub harvester 200. For example, plurality of catch members 414 may be spaced from aft of the top support shaft 436 of the aft reel in the X-direction to forward of top support shaft 426 of the forward reel. Any number of catch members may be spaced laterally across elongated support 412. For example, plurality of catch members 414 can include rows of catch members spaced into the page (e.g., in the Y-direction). Each row can include between one (1) catch member and five (5) catch members, or more preferably approximately two (2) catch members.

In various embodiments, shrub release system 240 can include any number of, and orientation of, catch assemblies 410 configured to receive a corresponding number of rows of plants, or more preferably two rows of plants simultaneously. As previously stated, catch assemblies 410 may be configured to grasp a shrub that has been removed from a shrub root disposed in the ground from shrub dislodging system 220, pull the shrub over a base of shrub dislodging system 220, and release the shrub aft of shrub harvester 200 from FIG. 3. While FIG. 3 illustrates three catch assemblies oriented side-by-side for a respective plurality of catch assemblies 280, the catch assemblies are not limited in this regard and can include more or less catch assemblies in an alternative manner depending on the application.

In various embodiments, plurality of catch members 414 may be configured to grasp a shrub during operation of shrub harvester 200. In this regard, as indicated by rotation arrows in FIG. 4C, forward reel 252 may rotate about main shaft 424 and aft reel 254 may rotate about main shaft 434 and drive reel assembly 250 from a bottom position (e.g., FIG. 4A) forward to a forward position (e.g., FIG. 4B), where plurality of catch members 414 may grasp a shrub proximate shrub dislodging system 220 from FIG. 3. From the forward position (e.g., FIG. 4B), plurality of catch members 414 may pull the shrub in the aft direction to a top position (e.g., FIG. 4C), through shrub release system 240 from FIG. 3 to an aft position (e.g., FIG. 4D) and release the shrub from shrub release system 240. In this regard, a shrub may be lifted over a base of shrub dislodging system 220 from FIG. 3 and released due to gravity at a location aft of shrub release system 240. As such, a plurality of shrubs may be dislodged from their root via shrub dislodging system 220 from FIG. 3, released aft of shrub harvester 200 via shrub release system 240 from FIG. 3, and be disposed aft of shrub harvester 200 in the field to be baled at a later point in time.

In various embodiments, each catch member in plurality of catch members 414 may be made of metal, such as steel, nickel, aluminum, or any other metal, preferably each catch member in plurality of catch members 414 are made of steel. Each catch member in the plurality of catch members can include any suitable thickness and/or length and can include uniform dimensions or varying dimensions. For example, in various embodiments, each catch member in plurality of catch members 414 can include a length within a range of approximately 24 inches to approximately 48 inches, or more preferably a length within a range of approximately 32 inches to approximately 36 inches. Each catch member in plurality of catch members 414 can include a cross-sectional dimension (e.g., diameter) transverse to its length that is within a range of approximately 1/16 inch to approximately 3 inches, or more preferably within a range of approximately 1/4 inch to approximately 1 inch. In various embodiments, each catch member in plurality of catch members 414 may be straight or curved. Plurality of catch members 414 may be angled, textured, grouped, and/or spaced in any suitable manner.

While illustrated as static herein, plurality of catch members 414 may be dynamic. For example, plurality of catch members 414 may be configured to vibrate, oscillate, or rotate in any manner to efficiently release the shrub from shrub release system 240 proximate an aft end of shrub harvester 200. In this regard, plurality of catch members 414 may be static upon grasping the shrub proximate a forward end of shrub harvester 200 from FIG. 3 and plurality of catch members 414 may be dynamic proximate an aft end of shrub harvester 200 from FIG. 3 to release the shrub proximate the aft end. Additionally, shrub release system 240 is not limited to a reel assembly as shown in FIGS. 4A-4D. Alternatively, a shrub release system 240 can include a track where the catch assembly travels from bottom aft to bottom forward, vertically then top forward to top aft. In this regard, in accordance with various embodiments, any suitable components to grasp a shrub, lift the shrub over a base, and release the shrub aft of a shrub harvester 200 may be utilized. As such, a shrub release system 240 may generally be configurable to grasp and release a plurality of shrubs, such as is outlined in steps 106 and/or 108 of method 100.

Figure 5:
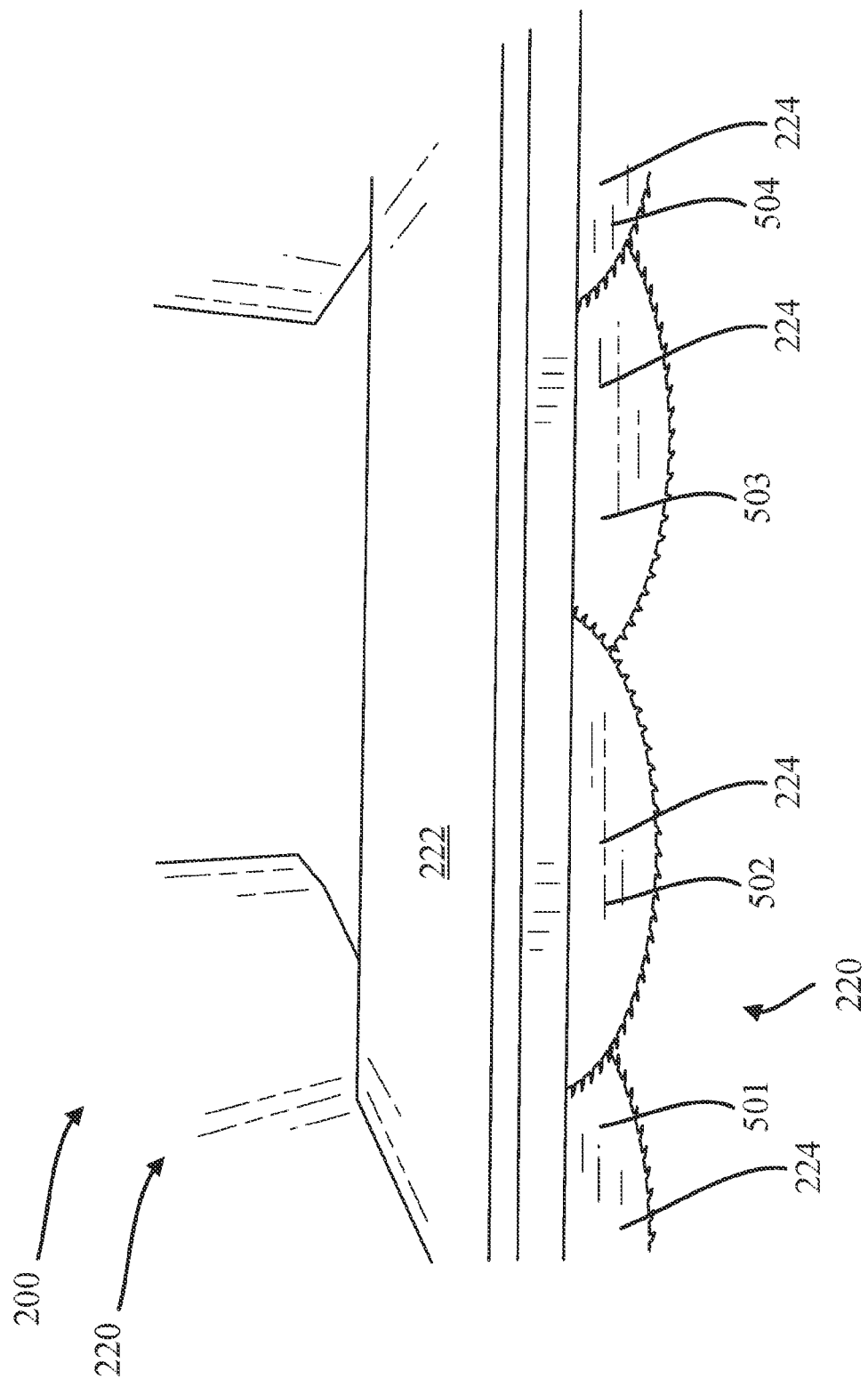

Referring now to FIG. 5, a portion of a shrub dislodging system 220 for a shrub harvester 200 is illustrated, in accordance with various embodiments. As mentioned previously, the shrub dislodging system is generally configured to separate a base of a shrub proximate the ground. As such, the shrub dislodging system may include any components configurable to dislodge stems of a shrub proximate the ground. In various embodiments, plurality of blades 224 may generally be interleaved below first base 222 of the shrub dislodging system. For example, a second blade 502 may be disposed between a first blade 501 and a third blade 503, and third blade 503 may be disposed between second blade 502 and a fourth blade 504. In this regard, first blade 501 and third blade 503 may extend below second blade 502 and fourth blade 504 in an overlapping manner. In various embodiments, by interleaving plurality of blades 224, contact with stems proximate a base of a respective shrub may be ensured during operation of shrub harvester 200 from FIG. 3. Each blade in plurality of blades 224 can include any suitable thickness and/or diameter and can include uniform dimensions or varying dimensions. For example, in various embodiments, each blade in plurality of blades 224 can include a diameter within a range of approximately 20 inches to approximately 32 inches, or more preferably approximately 26 inches. Each blade in plurality of blades 224 can include a thickness within a range of approximately 0.1 inch to approximately 1 inch, or more preferably approximately 0.5 inches.

Plurality of blades 224 can include any number and orientation of blades configured to receive a corresponding number of rows of shrubs. As previously stated, plurality of blades 224 may be configured to dislodge shrubs from roots disposed in the ground and release the shrubs aft of shrub harvester 200 from FIG. 3 and left to be baled at a later date. While illustrated as comprising four blades oriented interleaved and side-by-side, plurality of blades 224 are not limited in this regard and can include more or less blades oriented in an alternative manner depending on the application. As shrub harvester 200 from FIG. 3 moves through a field of shrubs, plurality of blades 224 may align with a corresponding number of rows of plants, which may "pass-above" plurality of blades 224 and first base 222 as shrub harvester 200 moves through the field.

The shrub harvester described herein may be configured to efficiently harvest shrubs from a plurality of rows of shrubs, for example, a plurality of rows of guayule shrubs, in a manner that results in minimal damage to the ground while maximizing the number of shrubs capable of being harvested. In various embodiments, the shrub harvester herein may be capable of harvesting approximately two (2) acres/hr. Moreover, the shrub harvester disclosed herein may be configured to remove multiple rows of shrubs simultaneously, for example, at least four rows of shrubs simultaneously.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method of harvesting a shrub utilizing a shrub harvester moveable in a direction of travel along one or more rows of shrubs to be harvested, the method comprising:
    dislodging a shrub from a shrub base thereof proximate a ground surface via a shrub dislodging system on the shrub harvester;
    receiving the shrub via a shrub release system on the shrub harvester with the shrub release system including at least one reel assembly that includes:
    a first sidewall;
    a second sidewall spaced from the first sidewall in a lateral direction transverse to the direction of travel such that a pass-through opening is defined between the first sidewall and the second sidewall with the pass-through opening configured to receive the shrub;
    a forward reel supported between the first sidewall and the second sidewall for rotation about a forward axis that extends in the lateral direction;
    an aft reel disposed aft of the forward reel and supported between the first sidewall and the second sidewall for rotation about an aft axis that extends in the lateral direction and is oriented parallel with the forward axis; and,
    a plurality of catch assemblies supported between the forward reel and the aft reel with each of the plurality of catch assemblies including an elongated support member and a plurality of catch members, the elongated support member of each of the plurality of catch assemblies supported between the forward reel and the aft reel in a predetermined angular orientation relative to the ground surface, and the plurality of catch members supported on the elongated support member and extending therebelow toward the ground surface with the plurality of catch members spaced apart from one another along the elongated support member in the direction of travel;
    simultaneously rotating the forward and aft reels of the at least one reel assembly respectively around the forward and aft axes thereof and thereby displacing the plurality of catch assemblies through a continuous closed path with the elongated support member of each of the plurality of catch assemblies remaining in at least approximately the predetermined angular orientation and the plurality of catch member extending therebelow to thereby at least grasp the shrub via the shrub release system on the shrub harvester as the forward and aft reels are simultaneously rotated; and,
    releasing the shrub via the shrub release system for discharge from the shrub harvester.

2. A method according to claim 1, wherein dislodging the shrub from the shrub base includes displacing one or more blades to cut through the shrub base of the shrub proximate to the ground surface.

3. A method according to claim 1, wherein receiving the shrub includes separating the shrub from a different shrub in an adjacent row of shrubs using a vertical cutter.

4. A method according to claim 1, wherein displacing the plurality of catch assemblies through the continuous closed path includes displacing the plurality of catch assemblies in the predetermined angular orientation from a bottom central position to a forward position and thereby grasping the shrub, and displacing the plurality of catch assemblies through the continuous closed path includes displacing the plurality of catch assemblies in the predetermined angular orientation from the forward position to a top central position and thereby lifting the shrub away from the ground surface and displacing the shrub in a direction opposite to the direction of travel of the shrub harvester.

5. A method according to claim 4, wherein displacing the plurality of catch members through the continuous closed path includes displacing the plurality of catch assemblies in the predetermined angular orientation from the top central position to an aft position and thereby further displacing the shrub in the direction opposite the direction of travel of the shrub harvester and releasing the shrub.

6. A method according to claim 4, wherein lifting the shrub away from the ground surface includes lifting the shrub via the shrub release system over a base of the shrub dislodging system.

7. A reel assembly transportable on a shrub harvester in a direction of travel along one or more associated rows of associated shrubs to be harvested from an associated ground surface, the reel assembly comprising:
    a first sidewall;
    a second sidewall spaced from the first sidewall in a lateral direction transverse to the direction of travel such that a pass-through opening is defined between the first sidewall and the second sidewall with the pass-through opening configured to receive the associated shrubs as the reel assembly is transported in the direction of travel;
    a forward reel supported between the first sidewall and the second sidewall for rotation about a forward axis that extends in the lateral direction;
    an aft reel disposed aft of the forward reel and supported between the first sidewall and the second sidewall for rotation about an aft axis that extends in the lateral direction and is oriented parallel with the forward axis, the aft reel configured to rotate simultaneously with the forward reel; and, a plurality of catch assemblies supported between the forward reel and the aft reel with each of the plurality of catch assemblies including an elongated support member and a plurality of catch members, the elongated support member of each of the plurality of catch assemblies supported between the forward reel and the aft reel in a predetermined angular orientation relative to the associated ground surface, and the plurality of catch members supported on the elongated support member and extending therebelow toward the associated ground surface with the plurality of catch members spaced apart from one another along the elongated support member in the direction of travel such that simultaneous rotation of the forward and aft reels of the reel assembly respectively around the forward and aft axes thereof displaces the plurality of catch assemblies through a continuous closed path with the elongated support member of each of the plurality of catch assemblies remaining in at least approximately the predetermined angular orientation relative to the associated ground surface and the plurality of catch members extending toward the associated ground surface throughout displacement along the continuous closed path.

8. A reel assembly according to claim 7, wherein the plurality of catch assemblies hang vertically from the elongated support member are configured to grasp the shrub and pull the shrub over a base during operation of the shrub harvester.

9. A reel assembly according to claim 7, wherein the forward reel includes a forward support shaft, the aft reel includes an aft support shaft, and one or more catch assemblies of the plurality of catch assemblies extends from the aft support shaft of the aft reel to the forward support shaft of the forward reel.

10. A reel assembly according to claim 9, wherein the aft reel includes an aft main shaft assembly that at least partially defines the aft axis with the aft support shaft disposed radially outward from the aft main shaft assembly, and the forward reel includes a forward main shaft assembly that at least partially defines the forward axis with the forward support shaft disposed radially outward from the forward main shaft assembly.

11. A reel assembly according to claim 10, wherein the aft reel includes first and second aft side supports that are spaced laterally from one another and operatively connect the aft support shaft with the aft main shaft assembly, and the forward reel includes first and second forward side supports that are spaced laterally from one another and operatively connect the forward support shaft with the forward main shaft assembly.

12. A reel assembly according to claim 11, wherein the aft support shaft extends laterally between the first and second aft side supports, the forward support shaft extends laterally between the first and second forward side supports, and the plurality of catch assemblies are operatively connected to the forward and aft support shafts laterally between the first and second aft side supports and laterally between the first and second forward side supports.

13. A reel assembly according to claim 9, wherein the aft support shaft for one catch assembly of the plurality of catch assemblies and the aft axis define a first plane, and the forward support shaft for the catch assembly of the plurality of catch assemblies and the forward axis define a second plane that is and remains substantially parallel to the first plane as the forward and aft reels rotate simultaneously with one another about the forward and aft axes.

14. A reel assembly according to claim 10, wherein the forward reel includes a plurality of forward support shafts that are angularly offset from one another about the forward axis, and the aft reel includes a plurality of aft support shafts that are angularly offset from one another about the aft axis.

15. A reel assembly according to claim 14, wherein the plurality of catch assemblies includes at least one catch assembly that is supported between a corresponding pair of one of the plurality of forward support shafts and one of the plurality of aft support shafts such that two or more catch assemblies of the plurality of catch assemblies are offset vertically and/or in the direction of travel from one another while remaining in the predetermined angular orientation as the plurality of catch assemblies are displaced through the continuous closed path.

16. A reel assembly according to claim 14, wherein the forward reel includes a plurality of pairs of first and second forward side supports each operatively connecting the forward main shaft assembly with a different one of the plurality of forward support shafts, and the aft reel includes a plurality of pairs of first and second aft side supports each operatively connecting the aft main shaft assembly with a different one of the plurality of aft support shafts.

17. A shrub harvester comprising:

a shrub dislodging system configured to dislodge an associated shrub from an associated shrub base thereof proximate an associated ground surface, the shrub dislodging system including a first plurality of blades coupled to a system base; and, a shrub release system situated aft of the shrub dislodging system and configured to grasp the associated shrub that is dislodged from the associated shrub base thereof proximate the associated ground surface via the shrub dislodging system, the shrub release system including at least one reel assembly according to claim 7 configured to lift the associated shrub over the system base.

18. A shrub harvester according to claim 17, wherein the shrub dislodging system includes a first vertical cutter disposed at a first front end of the first sidewall and a second vertical cutter disposed at a second front end of the second sidewall.

19. A shrub harvester according to claim 17, wherein the shrub release system is configured to release the shrub aft of the shrub harvester during operation.

20. A shrub harvester according to claim 17, wherein the shrub dislodging system includes a third sidewall spaced apart from the second sidewall forming a second pass-through opening configured to receive another associated shrub.

* * * * *